US007454283B2

(12) United States Patent
Borchsenius et al.

(10) Patent No.: US 7,454,283 B2
(45) Date of Patent: Nov. 18, 2008

(54) METHOD AND ENGINE CONTROL UNIT

(75) Inventors: Fredrik Borchsenius, Donaustauf (DE); Christoph Klesse, Donau (DE)

(73) Assignee: Siemens Aktiengesellschaft, Munich (DE)

( * ) Notice: Subject to any disclaimer, the term of this patent is extended or adjusted under 35 U.S.C. 154(b) by 74 days.

(21) Appl. No.: 11/670,186

(22) Filed: Feb. 1, 2007

(65) Prior Publication Data

US 2007/0192016 A1 Aug. 16, 2007

(30) Foreign Application Priority Data

Feb. 1, 2006 (DE) ....................... 10 2006 004 602

(51) Int. Cl.
*G06F 17/00* (2006.01)
*F02M 51/00* (2006.01)
*F02M 59/36* (2006.01)

(52) U.S. Cl. ........................... 701/102; 70/104; 70/115; 123/458

(58) Field of Classification Search ......... 701/101–105, 701/113, 115; 123/299, 300, 357, 445, 446, 123/456–458, 478, 480, 486; 73/114.38, 73/114.43
See application file for complete search history.

(56) References Cited

U.S. PATENT DOCUMENTS 5,713,332 A 2/1998 Adler et al. ................. 123/486
6,912,983 B2 * 7/2005 Okamoto et al. ............ 123/458
6,941,929 B2 * 9/2005 Shinzawa ................... 123/357
7,007,670 B2 * 3/2006 Okamoto et al. ............ 123/458
7,028,532 B2 * 4/2006 Shinzawa .................. 73/35.02
2004/4237036 11/2004 Qulst et al. ................. 715/236

FOREIGN PATENT DOCUMENTS

DE 44 18 731 A1 11/1995
DE 101 62 989 C1 10/2003
DE 10 2004 009 676 A1 12/2004
EP 1 529 940 A2 5/2005

* cited by examiner

*Primary Examiner*—Willis R Wolfe, Jr.
(74) *Attorney, Agent, or Firm*—Baker Botts L.L.P.

(57) ABSTRACT

A method for approximating a stored pilot control map of a pressure control valve of a common-rail pump to the effective of pilot control map of the pressure control valve is presented. The stored pilot control map forms a desired pressure in the rail on a control current of the pressure control valve. The method includes the following method steps a) measurement of the pressure in the rail; b) determination of the control current of the pressure control valve; and c) adaptation of the stored pilot control map by a regression process that includes the pressure measured in step a) and control current measured in step b). In the course of a test run lasting 120 seconds (s) the control deviations (dp) of the desired pressure from the actual pressure in the pressure control valve could be substantially reduced.

17 Claims, 5 Drawing Sheets

METHOD AND ENGINE CONTROL UNIT

RELATED APPLICATION

This application claims priority from German Patent Application No. DE 10 2006 004 602.1, which was filed on Feb. 1, 2006, and is incorporated herein by reference in its entirety.

TECHNICAL FIELD

The invention relates to a method for the approximation of a stored pilot control map of a pressure control valve of a common-rail pump to the effective pilot control map of the pressure control valve.

BACKGROUND

With common-rail systems, the system pressure in the rail is normally set by a pressure control valve. The pressure control valve guarantees a sufficiently accurate adjustability of the pressure during steady-state operation. During transient changes, a fast dynamic is required to enable a new operating state to be reached as quickly as possible and with the least possible deviations from the predetermined desired value.

With pressure control valves, the pressure in the rail can essentially be set by a magnetic force. For pressure regulation therefore, a PI controller with a pressure-dependent pilot control is used.

For reasons of stability, the speed at which a pressure regulation takes places is limited. A precise pilot control map is very important for achieving the minimum deviation from the desired pressure; the more exact this is the smaller the deviations of the desired pressure from the system pressure. The term "pilot control map" includes the term "pilot control characteristic curve".

At present, the pilot control map is normally stored in a one-dimensional table. For adaptation it is first necessary to detect steady-first state operating conditions. If a steady-state operating condition lies in the vicinity of a support point of the table, it is used for adaptation of this point of the table.

Filtering non steady-state operating conditions and measurements that do not lie close to a support point results in a slow and inaccurate adaptation.

SUMMARY

The object of this invention therefore is to enable an accelerated and improved adaptation of the pilot control map of a pressure control valve to be carried out.

This object can be achieved by 1 a method for approximating a stored pilot control map of a pressure control valve of a common-rail pump to the effective pilot control map of the pressure control valve, with the stored pilot control map mapping a desired pressure in the rail on a control current of the pressure control valve, the method comprising the steps of: a) Measurement of the pressure in the rail; b) Determination of the control current of the pressure control valve; and c) adaptation of the stored pilot control map by means of a regression process including the pressure measured in step a) and the control current measured in step b).

According to an embodiment, process steps a), b) and c) can be iterated. According to an embodiment, the stored pilot control map can be an analytical function, a sum of analytical functions, a polynomial, especially a third-grade polynomial, a sum of finite elements, a sum of b-spline functions, a sum of linear functions by sections or a table. According to an embodiment, method step b) and/or method step c) can be performed during a non steady-state condition of the common-rail pump. According to an embodiment, the regression process can be performed by an engine control unit. According to an embodiment, the regression process may use unfiltered measurements from step a) and step b).

The object can also be achieved by an engine control unit for performing the above method, comprising a first data storage area for a pilot control map that maps a desired pressure on a control current of the pressure control valve, a second data storage area for a measured point, especially a measured pressure, wherein the engine control unit includes a processor that is programmed in such a way that it adapts a pilot control map stored in the first data storage area by means of a regression process that includes a measured point stored in a second data storage area.

According to an embodiment, the engine control unit may comprise a processor that is programmed in such a way that the second data storage area is described by a new measured point and the regression process is iterated. According to an embodiment, the stored pilot control map can be an analytical function, a sum of analytical functions, a polynomial, especially a third-grade polynomial, a sum of finite elements, a sum of b-spline functions, a sum of linear functions by sections or a table. According to an embodiment, the engine control unit may comprise a processor that is programmed in such a way that step b) and/or step c) is/are carried out during a non steady-state condition of the common-rail pump. According to an embodiment, the engine control unit may comprise a processor that is programmed in such a way that the regression process uses unfiltered measurements from step a) and step b).

BRIEF DESCRIPTION OF THE DRAWINGS

The invention is explained in more detail in the following by means of an example, with reference to drawings. The drawings are as follows.

DETAILED DESCRIPTION

The dynamic behavior of the system can be clearly improved. Furthermore, the manufacturing tolerances for pressure control valves can be increased.

The method as claimed in the invention can be used for the approximation of a stored pilot control map of a pressure control valve of a common-rail pump to the effective pilot control map of the pressure control valve. For this purpose, according to an embodiment, the stored pilot control map maps a desired pressure in the rail on a control current of the pressure control valve. The control current of the pressure control valve is determined in one method step. This can be read directly from the pilot control map or can be measured. In a further method step, according to an embodiment, the stored pilot control map is adapted by means of a regression process that includes this measured point.

According to an embodiment, by a repeated determination of measured points and iteration of the regression process, the stored pilot control map can be even more accurately approximated to the effective pilot control map.

According to an embodiment, if the pilot control map is stored as an analytical function, the regression process can be performed particularly quickly. According to an embodiment, the effective map can, for example, be approximated by polynomials. Third degree polynomials have the advantage that they require little storage space, can be quickly processed and enable particularly good approximations to the effective map. According to an embodiment, the pilot control map can also be stored as a sum of analytical functions, a sum of finite elements, a sum of b-spline functions or a sum of linear functions by sections. According to an embodiment, it is also possible to store the map as a table.

According to an embodiment, the use of a regression process enables the pilot control map to also be adapted during a non steady-state condition of the common-rail pump. Contrary to a conventional method, the measurements of the pressure do not have to be filtered. This means that the pilot control map is more exact and the pressure control valve can also be more precisely controlled in transient states.

According to an embodiment, for performing the method, an engine control unit is proposed that has a first data storage area, a second data storage area and a processor. A pilot control map that maps a desired pressure on a control current of the pressure control valve can be stored in the first data storage area, whereas a measured pressure can be stored in the second storage area. According to an embodiment, the processor can be programmed in such a way that it adapts a pilot control map stored in the first data storage area, by means of a regression process that includes a measured point stored in the second data storage area.

Figure 1A:
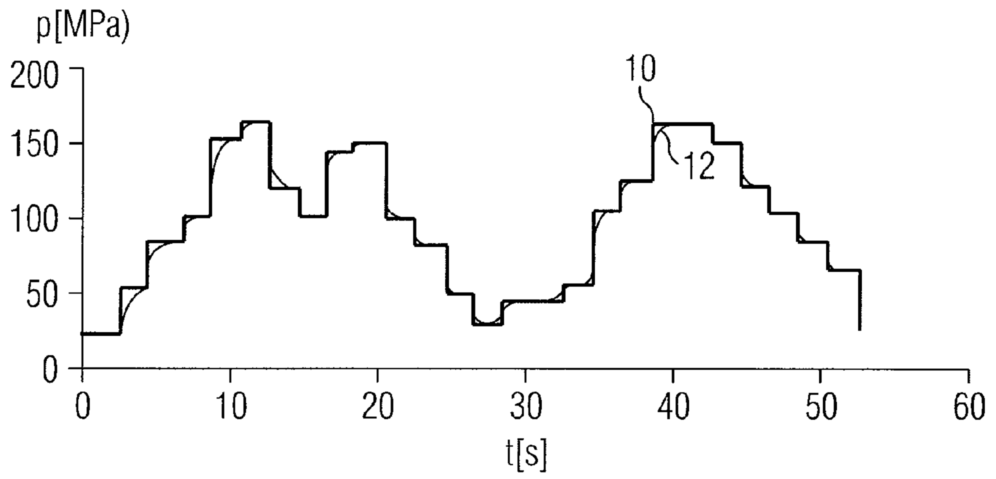
FIG. 1A Desired pressure characteristic and measured pressure characteristic for transient conditions on the test stand according to the prior art.

FIG. 1A shows the desired pressure characteristic 10 and a pressure characteristic 12, measured on the test stand, in the rail of a common-rail system with a pressure control valve, the pilot control map of which is controlled according to the prior art. The time t in seconds s is entered on the abscissa and the pressure p on the ordinate in megapascals MPa. A stable controller that ensures that the system in each case asymptotically approaches operating points is implemented in the common-rail system. In steady-state conditions there is hardly any discernible difference in this resolution between the desired pressure and the measured pressure in the rail. Under transient conditions the deviation between the desired pressure 10 and the measured pressure 12 is noticeable.

Figure 1B:
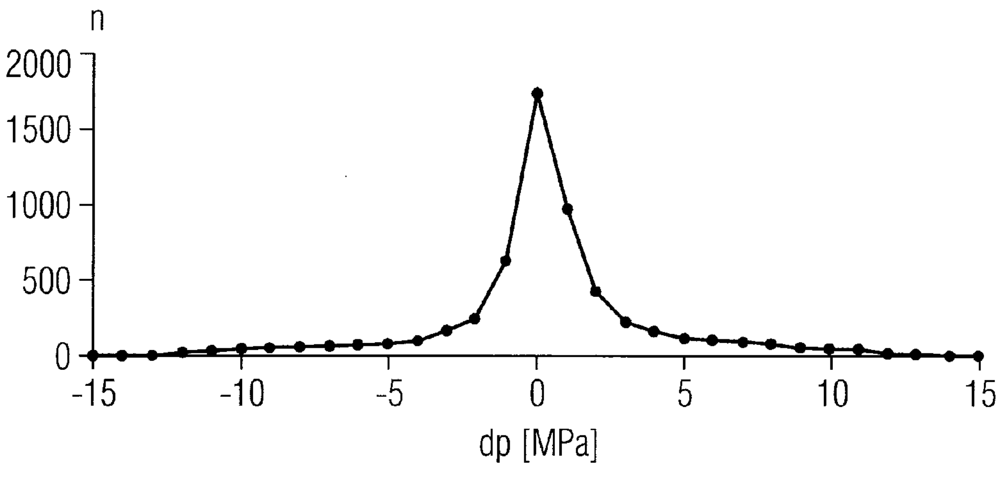
FIG. 1B Distribution of the control deviations of the measured pressure from the desired pressure according to the prior art.

FIG. 1B shows the distribution of the control deviations dp of the measured pressure 12 from the desired pressure 10 for the pressure characteristics measured in FIG. 1A. The control deviation dp is entered in megapascals on the abscissa, with the ordinate giving the frequency n of a control deviation. The analysis of the measured data shows that the control deviations are distributed around the equilibrium position. The complete system behaves like an attractor with operating conditions becoming more probable the closer they are to the state of equilibrium.

The approximation of a stored pilot control map to the effective pilot control map of a pressure control valve was first tested on a system test stand under reproducible conditions. FIGS. 2A, 2B, 3A and 3B refer to a first exemplary embodiment that was tested on the test stand.

Figure 2A:
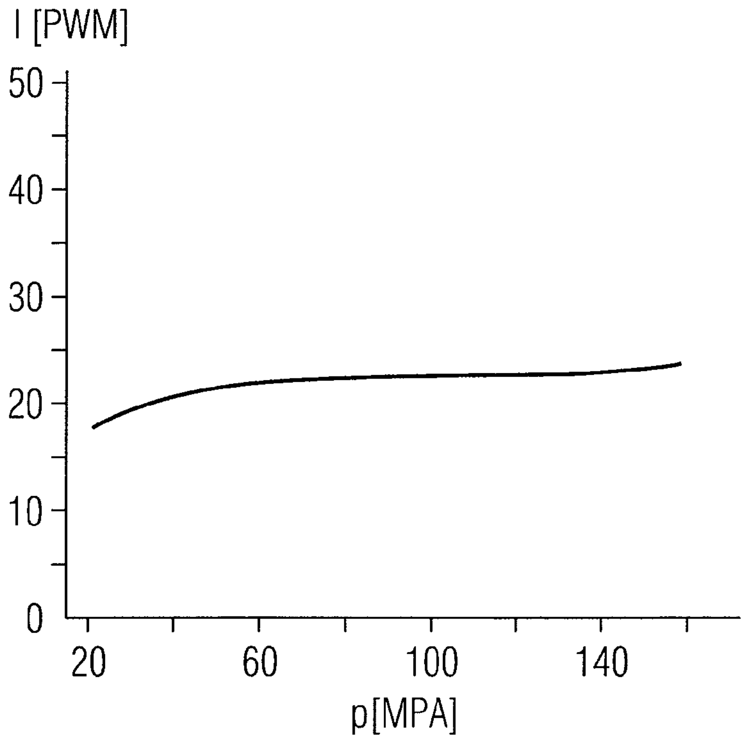
FIG. 2A Original pilot control map.

In this case, FIG. 2A shows an original pilot control map that depicts a desired pressure p in the rail on a control current I of the pressure control valve. The abscissa represents the desired pressure p in megapascals and the ordinate represents the current I with which the pressure control valve is controlled. The current I is entered in pulse width modulation, whereby a value of 100 would correspond to a direct current. The pilot control map was stored in the engine control system as a third-grade polynomial:

$$I=I(p)=\alpha_o+\alpha_1 p+\alpha_2 p^2+\alpha_3 p^3$$

An imprecise pilot control map as shown in FIG. 2A leads to large corrections of the PI controller and consequently means that the actual circuit flowing through the pressure control valve deviates strongly from the pilot control map. With the method described here, a current measured momentarily at the pressure control valve is used with the associated pressure for correction of the pilot control map. The pilot control map is approximated as an example of an application by the above polynomial. The actual status (current/pressure) is used by a regression process in order to modify parameters $a_o$, $a_1$, $a_2$, $a_3$ of the polynomial. The iterative repetition of the process means that the characteristic of the polynomial becomes optimally matched to the actual pilot control map of the pressure control valve.

Measured data for the system pressure and the current through the pressure control valve can be gathered in any sequence. In contrast to the prior art, no filtering of data is necessary. In particular, data from non steady-state conditions can also be used and also data that is not close to a support point of the stored pilot control map.

To perform the regression process, the pilot control map can, for example, be represented by characteristic points. A third-grade polynomial, for example, requires four characteristic points. These points are advantageously selected by means of a d-optimum test plan. A measured value is then added to the characteristic points. The pilot control map is then re-determined using these points and again reduced to the characteristic points. The weight of the measured values can additionally be modified by a multiplication factor, which can increase the rate of convergence. For a third-grade polynomial, the regression process can be reduced by solving a linear 4×4 equation system. This is analytically possible and therefore can be realized without difficulty in an engine control system. Furthermore, the data memory has to be able to hold only four characteristic points and one measured value.

Figure 2B:
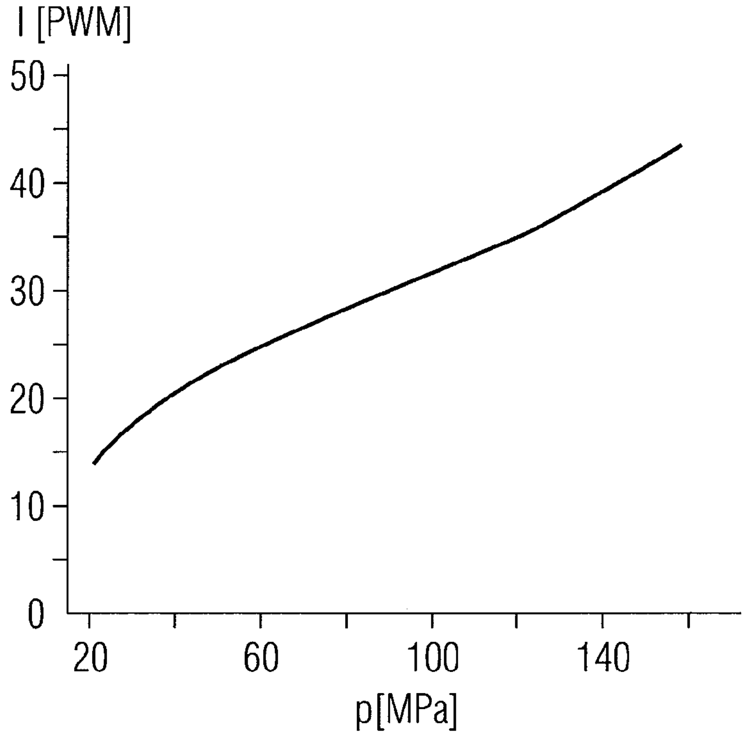
FIG. 2B Adapted pilot control map.

FIG. 2B shows the adapted pilot control map produced after 100 iterations from the pilot control map in FIG. 2A. The pilot control map was adapted for each iteration by means of a regression process. A measured point in this case covers a measurement of the pressure p in the rail and of the current I with which the pressure control valve is controlled. The pressure p is entered on the abscissa in megapascals MPa and the current I on the ordinate in pulse width modulation PWM.

The original pilot control map from FIG. 2A and the adapted pilot control map from FIG. 2B were then tested by means of a standard test procedure to determine how rapidly and precisely the rail pressure of a common-rail system could be adapted. For this purpose, a transient test procedure was defined that has a 55 second duration and consists of a series of step changes, at preset timed intervals, of the desired pressure in the rail. During the test procedure, both pilot control maps were fixed and therefore not adapted. The system pressure in the rail was measured during the course of the test procedures.

Figure 3A:
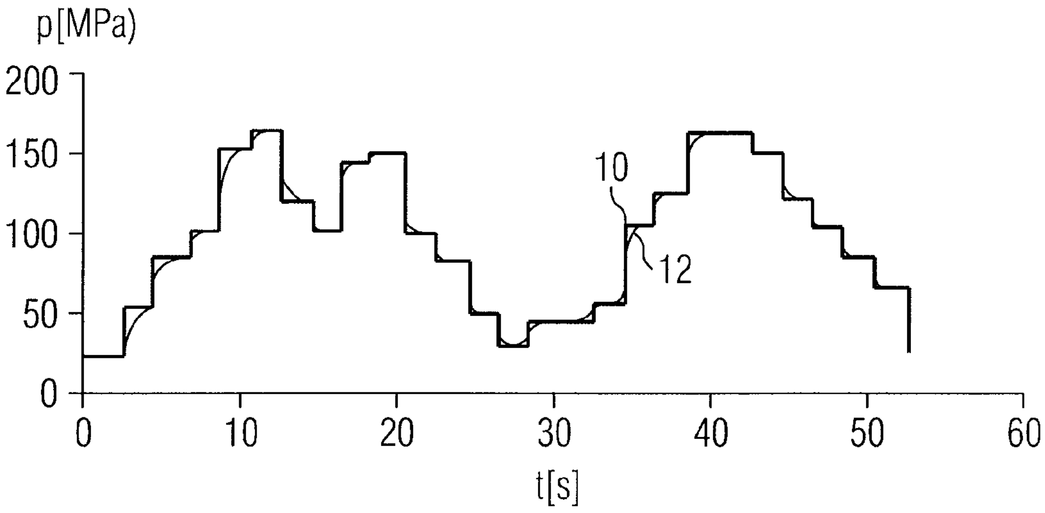
FIG. 3A Test procedure and measured system pressure for the original pilot control map.

FIG. 3A shows the time characteristic of the desired pressure 10 and the measured system pressure 12 for the original pilot control map of FIG. 2A. The time, in seconds, is entered on the abscissa; the pressure in megapascals was entered on the ordinate. The standard deviation between the desired pressure 10 and system pressure 12 is 3.2 megapascals. In steady-state conditions there is hardly any discernible difference in this resolution between the desired pressure and measured pressure in the rail. Under transient conditions the deviation between the desired pressure 10 and the measured pressure 12 is noticeable.

Figure 3B:
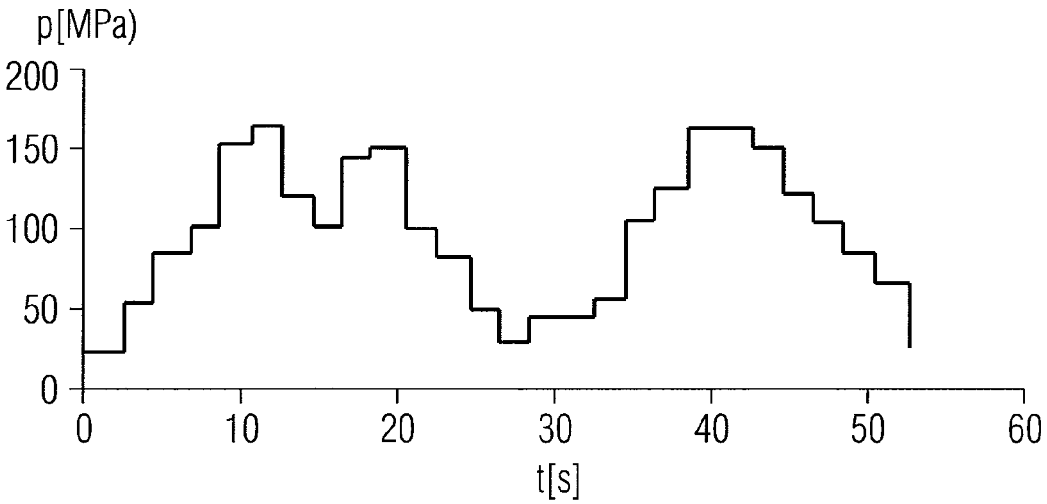
FIG. 3B Test procedure and measured system pressure for the adapted pilot control map.

FIG. 3B shows the time pressure of the desired pressure 10 and the measured system pressure 12 for the adapted pilot control map of FIG. 2B. The time in seconds is entered on the abscissa and the pressure in megapascals is entered on the ordinate. The standard deviation between the desired pressure and system pressure is still only 1.5 megapascals. Even at transient changes, practically no deviation of the system pressure 12 from desired pressure 10 can be detected, as can be seen in FIG. 3B.

Figure 4:
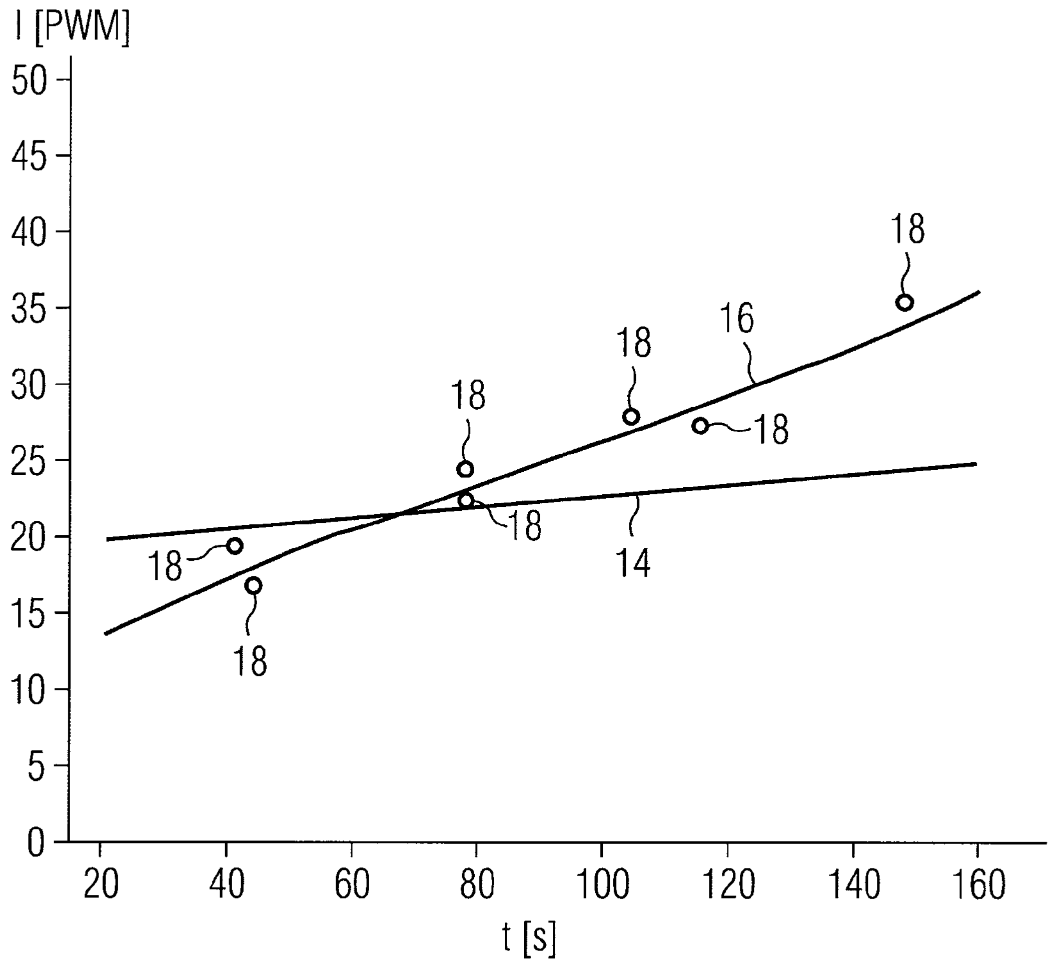
FIG. 4 Original pilot control map at the start of the test procedure and the adapted pilot control map.
Figure 5A:
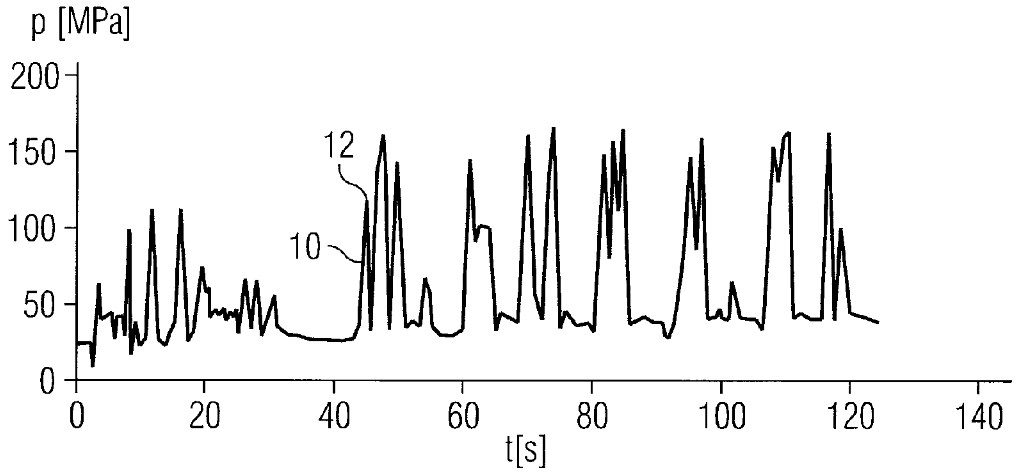
FIG. 5A Desired pressure and effective pressure during a test run.
Figure 5B:
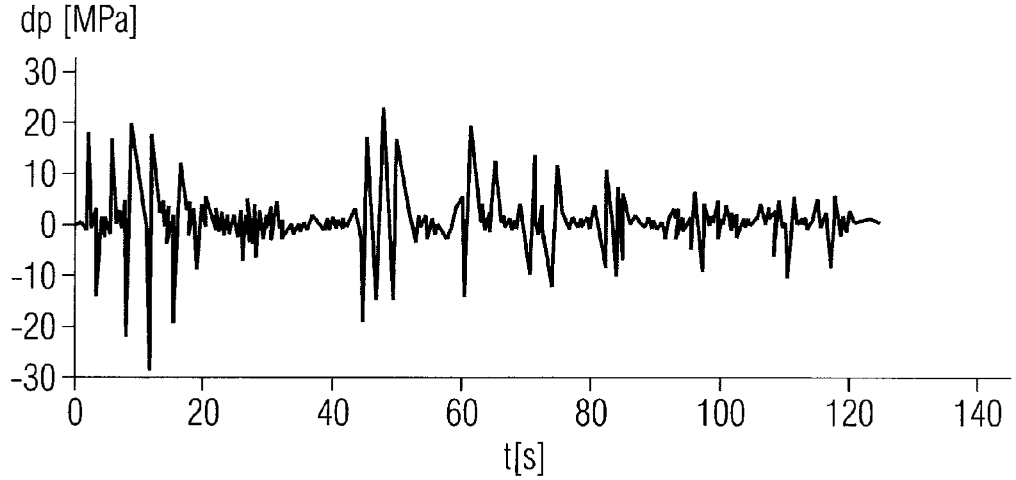
FIG. 5B Difference between the desired pressure and effective pressure during the test run.

FIGS. 4, 5A and 5B refer to a second exemplary embodiment that was road tested in a vehicle. A test procedure with an online adaptation in a vehicle was used for this purpose. The test procedure lasted two minutes.

FIG. 4 shows the original pilot control map 14 at the start of the test procedure and the adapted pilot control map 16. The desired pressure p is entered on the abscissa and the ordinates represents the current I with which the pressure control valve is to be controlled. Individual measured points 18 with which the pilot control map was iteratively adapted can also be seen. The adapted map emerged from 200 iterations after 120 seconds.

The same procedure was used in this test as in the example in FIG. 2A/2B. But because the same pressure control valve was not used in the vehicle as for the example on the test stand, the final result of the iteration resulted in a somewhat different pilot control map characteristic.

FIG. 5A shows the desired pressure 10 in the megapascals MPa that resulted from the test run of the vehicle and also the effective pressure 12 in the rail. The time t in seconds is entered on the abscissa and the pressure p is entered in megapascals MPa on the ordinate.

FIG. 5B shows the difference dp between the desired pressure and the effective pressure in megapascals mPa during the test run. The time in seconds is entered on the abscissa and the pressure difference in megapascals is entered on the ordinate. It can be seen that after approximately sixty seconds of driving the pilot control map was clearly better adapted than at the start of the run. The difference dp between the desired pressure and effective pressure is distinctly less in the second half of the test procedure than in the first half.

What is claimed is:

1. A method for approximating a stored pilot control map of a pressure control valve of a common-rail pump to the effective pilot control map of the pressure control valve, with the stored pilot control map mapping a desired pressure in the rail on a control current of the pressure control valve, the method comprising the steps of:

a) measurement of the pressure in the rail;

b) determination of the control current of the pressure control valve; and c) adaptation of the stored pilot control map by means of a regression process including the pressure measured in step a) and the control current measured in step b).

2. The method according to claim 1, wherein process steps a), b) and c) are iterated.

3. The method according to claim 1, wherein the stored pilot control map is an analytical function, a sum of analytical functions, a polynomial, especially a third-grade polynomial, a sum of finite elements, a sum of b-spline functions, a sum of linear functions by sections or a table.

4. The method according to claim 1, wherein method step b) and/or method step c) is/are performed during a non steady-state condition of the common-rail pump.

5. The method according to claim 1, wherein the regression process is performed by an engine control unit.

6. The method according to claim 1, wherein the regression process uses unfiltered measurements from step a) and step b).

7. An engine control unit for approximating a stored pilot control map of a pressure control valve of a common-rail pump to the effective pilot control map of the pressure control valve, comprising a first data storage area for a pilot control map that maps a desired pressure on a control current of the pressure control valve, a second data storage area for a measured point, especially a measured pressure, wherein the engine control unit comprises a processor that is programmed in such a way that it adapts a pilot control map stored in the first data storage area by means of a regression process that includes a measured point stored in a second data storage area, and wherein the engine control unit is operable to a) measure the pressure in the rail;

b) determine the control current of the pressure control valve; and c) adapt the stored pilot control map by means of a regression process including the pressure measured in a) and the control current measured in b).

8. The engine control unit according to claim 7, wherein the engine control unit comprises a processor that is programmed in such a way that the second data storage area is described by a new measured point and the regression process is iterated.

9. The engine control unit according to claim 7, wherein the stored pilot control map is an analytical function, a sum of analytical functions, a polynomial, especially a third-grade polynomial, a sum of finite elements, a sum of b-spline functions, a sum of linear functions by sections or a table.

10. The engine control unit according to claim 7, wherein the engine control unit comprises a processor that is programmed in such a way that step b) and/or step c) is/are carried out during a non steady-state condition of the common-rail pump.

11. The engine control unit according to claim 7, wherein the engine control unit comprises a processor that is programmed in such a way that the regression process uses unfiltered measurements from step a) and step b).

12. A method for approximating a stored pilot control map of a pressure control valve of a common-rail pump to the effective pilot control map of the pressure control valve, the method comprising the steps of:

measuring the pressure in the rail;

determining the control current of the pressure control valve; and adapting the stored pilot control map by means of a regression process including the measured pressure and the control current.

13. The method according to claim 12, wherein the process steps are iterated.

14. The method according to claim 12, wherein the stored pilot control map is an analytical function, a sum of analytical functions, a polynomial, especially a third-grade polynomial, a sum of finite elements, a sum of b-spline functions, a sum of linear functions by sections or a table.

15. The method according to claim 12, wherein measuring and/or adaptation is/are performed during a non steady-state condition of the common-rail pump.

16. The method according to claim 12, wherein the regression process is performed by an engine control unit.

17. The method according to claim 12, wherein the regression process uses unfiltered measurements.

* * * * *